United States Patent
Hongbin Hao et al.

[11] Patent Number: 6,163,586
[45] Date of Patent: Dec. 19, 2000

[54] AUTOBAUD/AUTOECHO METHOD

[75] Inventors: Jerry Hongbin Hao, San Jose; Bill Kolb, Sunnyvale, both of Calif.

[73] Assignee: Philips Electronics North America Corp., New York, N.Y.

[21] Appl. No.: 09/204,029

[22] Filed: Dec. 1, 1998

[51] Int. Cl.[7] .............................. H04L 23/00; H04B 3/46
[52] U.S. Cl. ......................... 375/377; 710/60; 375/225
[58] Field of Search .............................. 713/600; 710/29, 710/60; 375/225, 377

[56] References Cited

U.S. PATENT DOCUMENTS

| | | | |
|---|---|---|---|
| 3,747,074 | 7/1973 | Schulze . | |
| 5,008,902 | 4/1991 | Key et al. | 375/225 |
| 5,206,888 | 4/1993 | Hiraguchi et al. | 377/20 |
| 5,222,081 | 6/1993 | Lewis et al. | 75/117 |
| 5,627,858 | 5/1997 | Mak et al. | 375/225 |
| 5,654,983 | 8/1997 | Sauser, Jr. | 375/225 |
| 5,982,837 | 11/1999 | Earnest | 375/377 |

FOREIGN PATENT DOCUMENTS

0669738A2 7/1973 European Pat. Off. ........ H04L 25/02

Primary Examiner—Thomas M. Heckler
Attorney, Agent, or Firm—Jack D. Slobod

[57] ABSTRACT

An autobaud method for automatic detection of baud rate and character configuration of a received asynchronous serial data stream by detecting a first predetermined two character sequence in uppercase and lowercase form, notably "AT" and "at", from patterns of signal states and their durations, also provides for detecting a second predetermined two character sequence of "A/" and "a/" and for substantially immediate automatic echoing of the first and second predetermined character sequences if autoechoing is enabled. The baud rate and character configuration used for subsequent characters is not be changed unless, after the autobaud function is enabled, the first predetermined two character sequence in either uppercase or lowercase form is received, and a different baud rate and/or character configuration is determined from the received pattern of signal states and their durations. The baud rate is determined by measuring the duration of a signal state begun by an apparent transition from a stop bit or idle state, and determining whether the measured duration falls within any of a set of predetermined bit time ranges or legal windows, each corresponding to a different baud rate of a set of predetermined standard baud rates.

7 Claims, 5 Drawing Sheets

AUTOBAUD/AUTOECHO METHOD

BACKGROUND OF THE INVENTION

1. Field of the Invention

The present invention relates to a method for automatic detection of baud rate and character configuration of a received asynchronous serial data stream, such as number of bits per character, and whether even, odd, or no parity is used, by detecting at least a first predetermined two character sequence from patterns of signal states and their durations.

2. Description of the Related Art

Such a method is known from EP 0 669 738 A2 in which it is indicated that the predetermined two character sequence must conform to the requirement that each character of the sequence has at least one single bit transition (a "010" or "101" bit string) and the two characters have different parity values.

It is also well known in asynchronous serial data communications to use the two character sequence "AT" or "at" as control characters which are a prefix to commands issued from the sending device to the receiving device. This two character sequence in either uppercase or lowercase form conforms to the aforementioned requirement when it is considered that all characters are preceded by a stop bit or idle state of "1" followed by a start bit of "0". For example, the characters "A" and "a" begin after the start bit with the 7 bit string "10000?1" (where "?" is "0" for "A" and "1" for "a") irrespective of whether the number of bits per character is 7 or more, and irrespective of whether even, odd, or no parity is used. When a character sequence of either "AT" or "at" is received at a communications device, it is typically necessary for the receiving device to echo the sequence back to the sending device in order for communications to continue. The echoing may be commanded by a software application accessing the receiving device or may be done automatically by the receiving itself in an "autoecho" mode. Depending on the communication protocol established, it may be required that the receiving device also automatically echo the character sequence "A/" or "a/", which is typically used to indicate that the previous command should be executed by the receiving device.

With each new multimedia or internet application, higher baud rates are needed in systems such as modems which operate at variable baud rates. Where once upper limits of several to tens of thousand baud were sufficient in such systems, now rates approaching one million baud will be used in systems having a variable baud rate. Autobaud detection at such a high baud rate is not generally realizable in available serial data communication receivers, because of the short time allowed to detect an "AT" or "at" sequence (and also if required an "A/" or "a/" sequence) in a data stream of unknown baud rate, character length, and parity, and to decide whether it should be echoed.

SUMMARY OF THE INVENTION

It is an object of the present invention to provide a method for rapid and reliable automatic detection of baud rate and character configuration of a received asynchronous serial data stream by detecting a first predetermined two character sequence in uppercase and lowercase form, notably "AT" and "at", from patterns of signal states and their durations.

It is yet another object of the present invention to provide for also detecting a second predetermined two character sequence of "A/" and "a/" and for substantially immediate automatic echoing of the first and second predetermined character sequences, namely "AT", "at", "A/", and "a/".

The present invention is based on the insight that since the first predetermined two character sequence "AT" or "at" is used as a command prefix, the baud rate and character configuration used for subsequent characters should not be changed unless, after the autobaud function is enabled, this first predetermined two character sequence in either uppercase or lowercase form is received, and a different baud rate and/or character configuration is determined from the received pattern of signal states and their durations in the received waveforms corresponding to this character sequence.

The aforementioned and other objects of the present invention are satisfied by such a method which is characterized by the steps of waiting for a transition from a state corresponding to a stop bit or idle state to a state corresponding to a start bit of a first character; measuring the duration of a signal state of the first character begun by said transition; determining whether the measured duration falls within any of a set of predetermined bit time ranges, each bit time range corresponding to a different baud rate of a set of predetermined standard baud rates; and if the measured duration does not fall within any of the predetermined ranges, returning to waiting for the transition from the state corresponding to a stop bit or idle state to a state corresponding to a start bit. If the measured duration falls within any of the predetermined bit time ranges, it is determined if the first predetermined two character sequence is received using a standard bit time associated with the bit time range in which the measured duration falls; and if it is determined that the first predetermined two character sequence is received using the standard bit time, the character configuration is determined therefrom; and the standard bit time and determined character configuration are used for receiving subsequent characters.

By determining a standard bit time from measuring the duration of the start bit, providing the measured duration falls within any of a set of predetermined bit time ranges or legal windows, it is assured that the first character of the first predetermined two character sequence (which is also the first character of the second predetermined character sequence) can be detected as early as possible.

The method of the present invention is further characterized in that the preceding step of determining if the first predetermined two character sequence is received further comprises determining if the first character is a potential or actual "A" or "a"; and in that the method further comprises that if it is determined that the first character is potentially or actually an "A" or "a", the first character is echoed, the echoing being started before or during reception of a second character.

Since, the first character is detected as early as possible, its echoing can be started even before or during reception of the second character.

The method of the present invention is still further characterized in that is determined if the first predetermined two character sequence or a second predetermined two character sequence of either "A/" or "a/" is received, and also is characterized in that the second character is echoed if it is determined that the first predetermined two character sequence or the second predetermined two character sequence is received.

Another aspect of the present invention is that the duration of a next signal state of the first character measured, which state is begun by a next transition from the state corresponding to the start bit to a state which is the same as that corresponding to a stop bit or idle state; and it is determined whether the measured duration of the next signal state falls within the predetermined bit time range in which the previously duration measured falls; and if the measured duration of the next signal state does not fall within said predetermined bit time range, there is a returning to waiting for a start bit after waiting for at least a guard time equal to the previously determined standard bit time times a maximum number of bits per character.

Consequently, if the duration of the next signal state does not properly correspond to the fact that the bit pattern after the start bit begins with "10" for an "A" or "a", another start bit is looked for after a delay sufficient to skip to the stop bit of, or idle state after, the present character.

It is pointed out that U.S. Pat. No. 3,747,074 discloses a system for baud rate detection in which it appears the character configuration is predetermined, and a measured baud rate code interval of a predetermined character configuration of nine bits is correlated with a set of ranges of minimum and maximum values, each range corresponding to a different standard baud rate. However, therein, there is no bit time determination from the start bit.

Other objects, features and advantages of the present invention will become apparent upon perusal of the following detailed description when taken in conjunction with the appended drawing, wherein:

DETAILED DESCRIPTION OF THE PREFERRED EMBODIMENTS

The method for automatic baud rate and character configuration of the present invention is based on the detection in an asynchronous serial channel, after commanding that an autobaud function be enabled or turned ON, of a certain first predetermined sequence of two consecutive characters in either uppercase or lowercase form, namely "AT" (Hex 41, 54) or "at" (Hex 61, 74), to enable further reception and to set up the baud rate and character configuration used for subsequent reception and transmission communications. The autobaud function will continue to look for this predetermined two character sequence until it is found or until the autobaud function is disabled by command. Once the first predetermined two character sequence is found, the autobaud function will disable itself. Also, a second predetermined two character sequence in uppercase or lowercase form, namely "A/" (Hex 41, 2f) or "a/" (Hex 61, 2f), is looked for and used to enable further reception but is not used to change the existing baud rate and character configuration.

The present invention also provides for an "autoecho" function, wherein the first predetermined two character sequence or the second predetermined two character sequence, when received, is transmitted substantially immediately by the receiving device back to the sending device.

Figure 1:
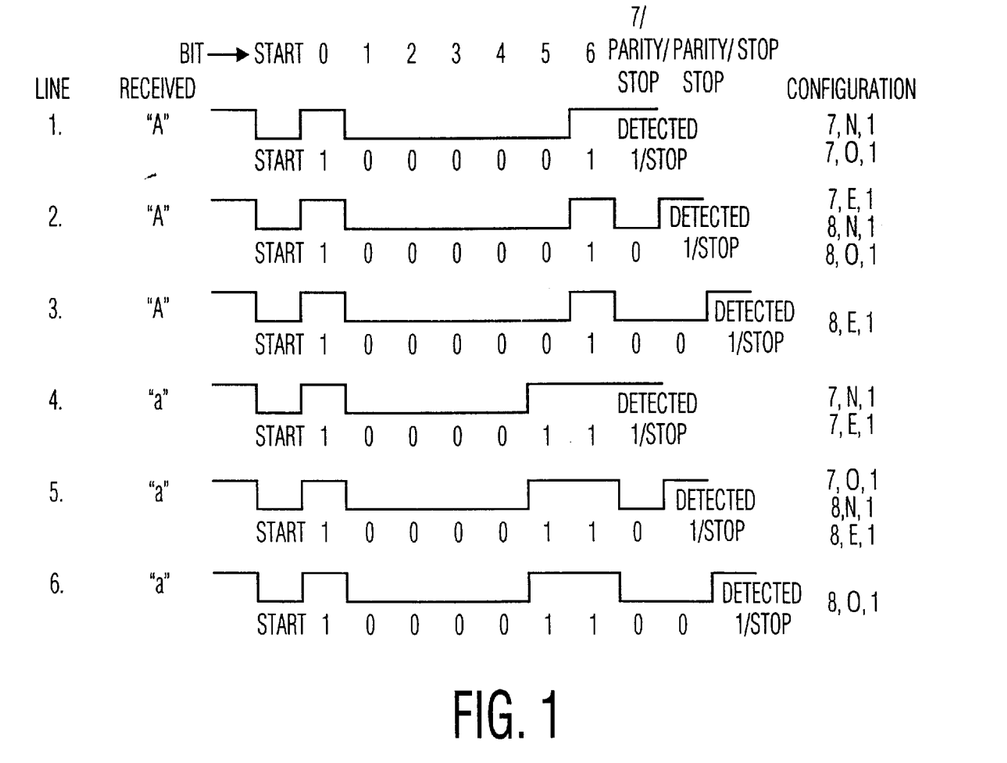
FIG. 1 shows waveforms of signals corresponding to first characters "A" and "a" for different indicated combinations of 7 or 8 bits per character, and no (N), odd (O), or even (E) parity, each with 1 stop bit.
Figure 2:
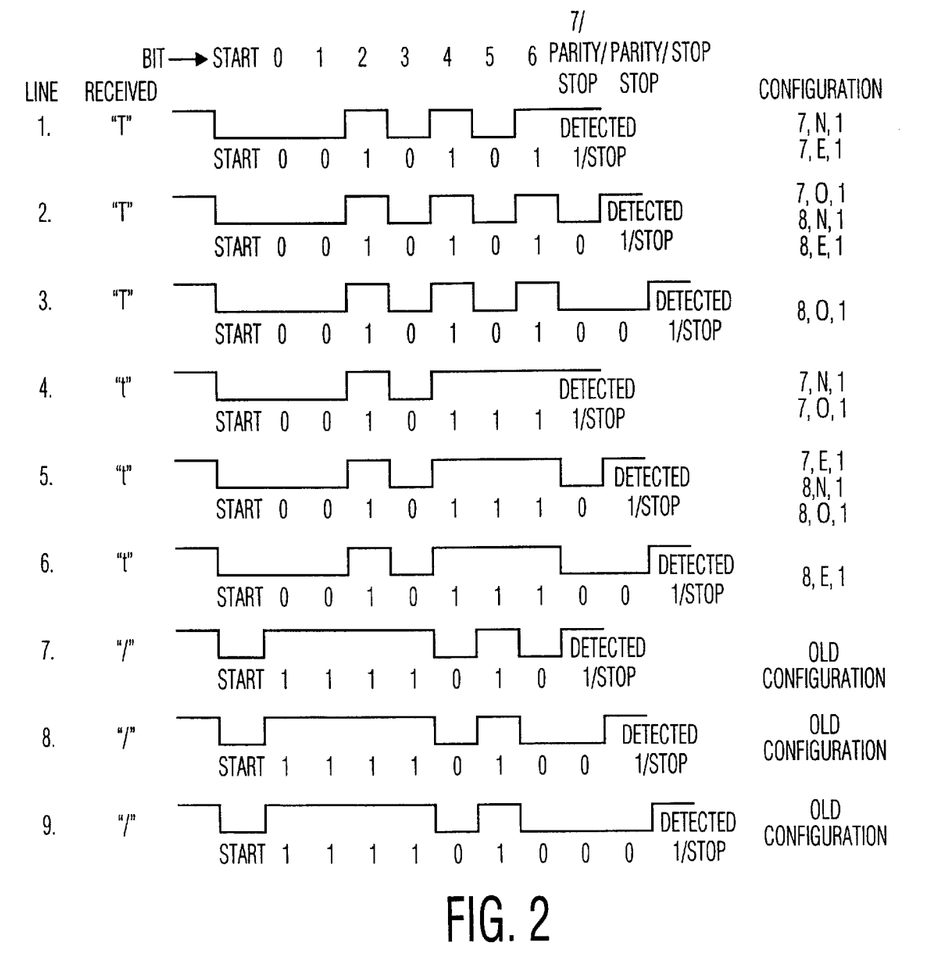
FIG. 2 shows waveforms of signals corresponding to second characters "T", "t", and "/" for different indicated combinations of 7 or 8 bits per character, and no (N), odd (O) or even (E) parity, each with 1 stop bit.

FIGS. 1 and 2 depict the waveforms of the first and second characters of interest, respectively, for different indicated combinations of 7 or 8 bits per character, and no (N), odd (O), or even (E) parity, each with 1 stop bit. It is also common to use 2 stop bits, rather than one, but the use thereof is indistinguishable from one stop bit, because characters are followed after the stop bit(s) by an idle state of indefinite length which maintains the logic "1" level of the last stop bit.

FIG. 1 shows respective waveforms:

on the first line corresponding to an "A" in either 7,N,1 or 7,O,1 character configuration;

on the second line corresponding to an "A" in either 7,E,1 or 8,N,1 or 8,O,1 character configuration;

on the third line corresponding to an "A" in 8,E,1 character configuration;

on the fourth line corresponding to an "a" in either 7,N,1 or 7,E,1 character configuration;

on the fifth line corresponding to an "a" in either 7,O,1 or 8,N,1 or 8,E,1 configuration; and on the sixth line corresponding to an "a" in 8,O,1 character configuration.

FIG. 2 shows respective waveforms:

on the first line corresponding to a "T" in either 7,N,1 or 7,E,1 character configuration;

on the second line corresponding to a "T" in either 7,O,1 or 8,N,1 or 8,E,1 character configuration;

on the third line corresponding to a "T" in 8,O,1 character configuration;

on the fourth line corresponding to a "t" in either 7,N,1 or 7,O,1 character configuration;

on the fifth line corresponding to a "t" in either 7,E,1 or 8,N,1 or 8,O,1 configuration;

on the sixth line corresponding to a "t" in 8,O,1 character configuration; and on lines 7 through 9, corresponding to a "/".

Further, Table 1 below summarizes the determination of character configuration from the possible received bit patterns corresponding to the first predetermined two character sequence, namely "AT" or "at":

TABLE 1

| First Received Pattern excluding start bit | Second Received Pattern excluding start bit | New Configuration |
| --- | --- | --- |
| 10000011... | 0101011... | 7,N,1 |
| 10000111... | 00101011... | |
| 10000011... | 00101111... | 7,O,1 |
| 100001101... | 00101111... | |
| 100000101... | 00101111... | 7,E,1 |
| 10000111... | 001011101... | |
| 100000101... | 001010101... | 8,N,1 |
| 100001101... | 001011101... | |
| 100000101... | 0010101001... | 8,O,1 |
| 1000011001... | 001011101... | |
| 1000001001... | 001010101... | 8,E,1 |
| 100001101... | 001011100... | |
| 10000011... | 1111010... | Keep previous configuration |
| 100000101... | 1111010... | |

TABLE 1-continued

| First Received Pattern excluding start bit | Second Received Pattern excluding start bit | New Configuration |
|---|---|---|
| 1000001001... | 1111010... | |
| 10000111... | 1111010... | |
| 100001101... | 1111010... | |
| 1000011001... | 1111010... | |
| Any other pattern combinations | | Illegal pattern, continue autobaud detection |

It should be apparent from FIGS. 1 and 2 that it is not possible to determine character configuration solely from a first character having any of the waveforms on lines 1, 2, 5, and 6 of FIG. 1. Further, the determination of an "A" or "a" from the waveforms on lines 1 and 3, is not certain since it is possible that these waveforms also represent high bit characters (characters of 8 bit length with a most significant bit (MSB) of 1. Therefore, while baud rate is uniquely determinable from receipt of any of the first character waveforms shown in FIG. 1 (particularly from the start bit of "0" and the first five least significant bits "10000" after the start bit), in some cases only a potential rather than an actual "A" or "a" is determined. It takes reception of a two successive character waveform corresponding to the first predetermined two character sequence of "AT" or "at" in order to uniquely determine the transmitted character sequence in accordance with Table 1.

The autobaud function is based on initially determining from a received waveform corresponding to a first character, whether the duration of a signal state begun by an apparent transition from a stop bit or idle state to a start bit falls within any of a set of predetermined bit time ranges or legal windows, each bit time range or legal window corresponding to a different baud rate of a set of predetermined standard baud rates, and also that the entire bit pattern is consistent with a potential or actual "A" or "a", albeit possibly of somewhat indeterminate character configuration.

All baud rate measurement is relative to CClk, the system clock. For autobaud detection purposes, the highest baud rate supported is 1/32 of the source clock CClk frequency. Specifically, the set of standard baud rates are Baud Rate$_M$= CClk/32M, where M=$2^i 3^j$ for i=0 to n, and j=0 to 1. Preferably, CClk=29.4912 MHZ and n equals 8, yielding a set of 18 standard baud rates (numbered 1 through 18) ranging from 921,600 bps down to 1,200 bps. The standard bit time BT corresponding to each standard baud rate is 32M clock cycles of CClk. For each standard bit time BT, a window width W has been empirically selected in the range of from 10M to 14M clock cycles. The baud rate number, M, Baud Rate$_M$, and the corresponding bit time BT, and window width W are shown in the following Table 2:

TABLE 2

| Rate No. | M | Baud Rate$_M$ (bps) | BT (CClk cycles) | W (CClk cycles) |
|---|---|---|---|---|
| 1 | 1 | 921,600 | 32 | 14 |
| 2 | 2 | 460,800 | 64 | 24 |
| 3 | 3 | 307,200 | 96 | 32 |
| 4 | 4 | 230,400 | 128 | 40 |
| 5 | 6 | 153,600 | 192 | 64 |
| 6 | 8 | 115,200 | 256 | 86 |
| 7 | 12 | 76,800 | 384 | 130 |
| 8 | 16 | 57,600 | 512 | 174 |

TABLE 2-continued

| Rate No. | M | Baud Rate$_M$ (bps) | BT (CClk cycles) | W (CClk cycles) |
|---|---|---|---|---|
| 9 | 24 | 38,400 | 768 | 260 |
| 10 | 32 | 28,800 | 1,024 | 350 |
| 11 | 48 | 19,200 | 1,536 | 524 |
| 12 | 64 | 14,400 | 2,048 | 702 |
| 13 | 96 | 9,600 | 3,072 | 1,098 |
| 14 | 128 | 7,200 | 4,096 | 1,356 |
| 15 | 192 | 4,800 | 6,144 | 2,098 |
| 16 | 256 | 3,600 | 8,192 | 2,814 |
| 17 | 384 | 2,400 | 12,288 | 4,914 |
| 18 | 768 | 1,200 | 24,576 | 9,832 |

While a system frequency CClk of 29.4912 MHz is assumed for Table 2, it should be understood that scaling the frequency of the system clock will scale the values of the valid baud rates by the same factor. In this manner, uncommon baud rates can be detected through careful selection of the system clock frequency.

Figure 3:
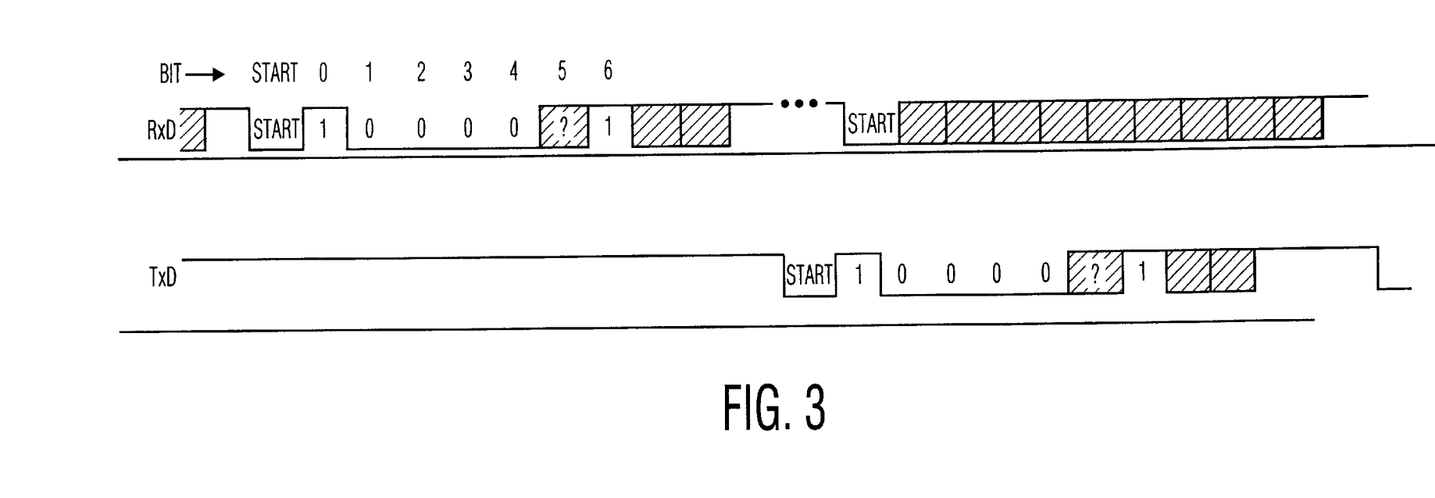
FIG. 3 shows on the first line a received waveform constituting a sequence of first and second characters, and on a second of a transmitted waveform echoing the received first character.

The desired automatic echoing is depicted in FIG. 3, showing the waveforms of a two character sequence on receive line RxD, the first character of which is potentially or actually an "A" or "a", and the echoing of the first character on transmit line TxD, wherein the echoing is started preferably before, or during the reception of the second character of the sequence. Because character configuration is not yet determined when the first character is being echoed, it is echoed "raw", i.e. the received series of signal samples from the start bit to the final "0" to "1" transition is sent, with the final "1" state being held for a sufficient time to include a possible parity bit and a possible second stop bit.

The second character will also be echoed if autoechoing is enabled and:
  The current character is a "t" and the previous character is an "a" ; or
  The current character is a "T" and the previous character is an "A"; or
  The current character is a "/" and the previous character is an "a" or an "A", or;
  The current character is an "a" or an "A".

If 'a's and 'A's are received back-to-back, it is possible that not all 'a's or 'A's in the character string will be echoed because dummy bits can be appended to the end of the stop bits of the characters. It is, however, guaranteed that a legal character pair for autobaud detection ("at", "a/", "AT" or "A/") will be echoed if autoecho is enabled.

Figure 4:
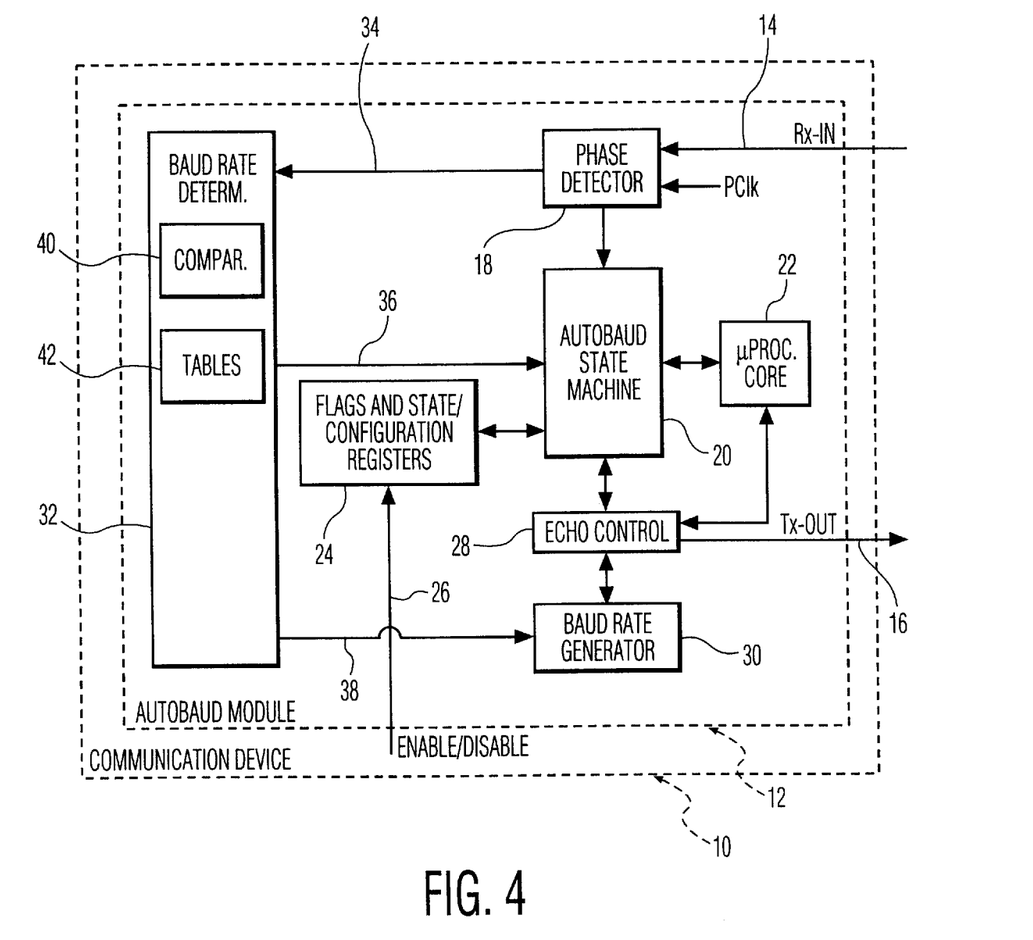
FIG. 4 shows a communication device including an autobaud module.

FIG. 4 shows a communications device or controller 10, including an autobaud module 12. Where the device 10 controls a plurality of separate serial data communications channels each having its own autobaud module, module 12 is considered as being for the ith channel, which channel includes its own serial input receiving line 14, labeled Rx-IN, and its own serial output transmitting line 16, labeled Tx-OUT. The asynchronous serial digital data stream arriving on input receiving line 14 is sampled by phase detector 18, at both rising and falling edges of a peripheral clock PClk which has a frequency equal to one half the system clock CClk; the use of both phases of peripheral clock PClk produces sampling at the rate of the system clock CClk. The series of samples produced by phase detector 18 are output to autobaud state machine 20 which has states corresponding to the various different bit positions in the two character sequences of interest. Autobaud state machine 20 communicates bidirectionally with a microprocessor core 22 of device 10 and with flags and state/configuration registers 24. These registers include an interrupt flag (not shown), a bit (not shown) which indicates by a "0" that the autobaud function is OFF or not enabled, and by a "1" that the autobaud function is enabled, and a further bit (not shown) which indicates by a "0" that the autoecho function is OFF or not enabled, and by a "1", that the autobaud function is enabled. The aforementioned flag and function states may be enabled or disabled via control line 26 in response to specific commands issued from device 10 to module 12.

Autobaud state machine 20 also communicates bidirectionally with an echo control 28. The latter feeds output line 16 and also communicates bidirectionally with microprocessor core 22 and with a baud rate generator 30. The series of samples of received input data produced by phase detector 18 is also fed via line 34 to a baud rate determination means which is configured to count samples at a same level or signal state so as to measure durations between transitions, to compare, utilizing comparator 40, measured durations of signal states with bit time ranges or legal windows W read from lookup tables 42 corresponding to Table 2, in order to determine the value of M corresponding to a bit time range or legal window W which includes the measured duration of an apparent start bit. A value of M so determined by baud rate determination means 32 is communicated to autobaud state machine 20 via line 36, and to baud rate generator 30 via line 38.

It is also pointed out that in order to obtain sufficient speed to recognize characters from received waveforms without a priori knowledge of the baud rate, which can be as high as 921,600 bps, and to determine whether to substantially immediately echo characters, the various blocks of autobaud module 12 are implemented in hardware, e.g. autobaud state machine 20 is implemented as a gate array. The design of the blocks of autobaud module 12 is carried out in a known manner by computer design from functional descriptions, which can readily be derived by a person of ordinary skill in the art from the following discussion of the autobaud function, wherein reference is made to FIG. 5.

Figure 5:
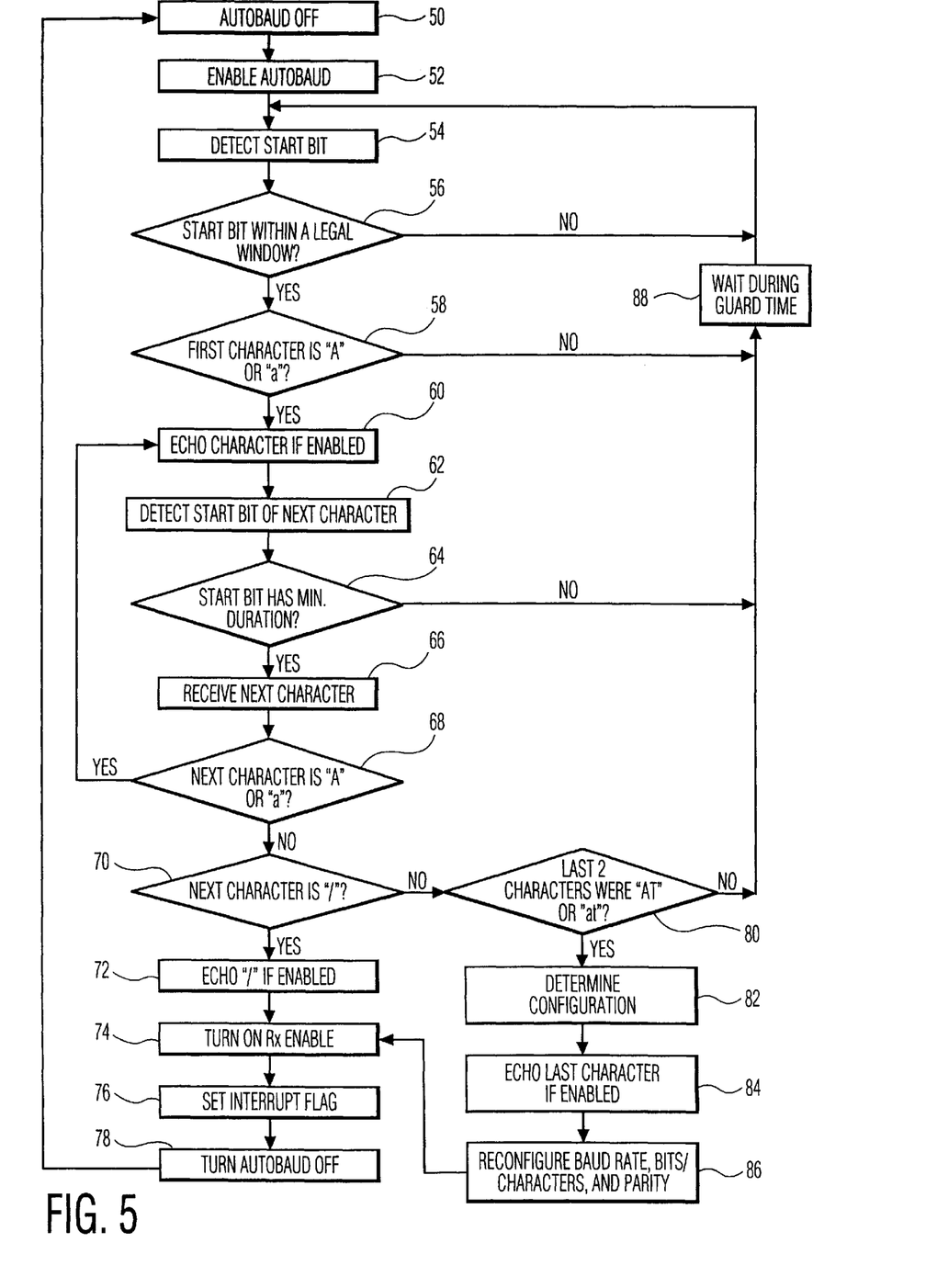
FIG. 5 shows a flow chart of the method carried out by the autobaud module shown in FIG. 4.

FIG. 5 is a flow chart showing the operation of the autobaud module in FIG. 5; the various steps or states are as follows:

50. Autobaud OFF
52. Enable Autobaud
   b Write a '1' to the corresponding bit in the configuration register to enable autobaud for serial channel i, and continue.
54. Detect Start Bit
   a. RxD (received data) is '1', else wait for '1' in RxD.
   b. Wait for Start Bit: Wait for a '0', and continue.
56. Start Bit within a legal window?
   Measure Start Bit: Count the number of source clock cycles until a '1' is received. If the number of source clock cycles is within a detection window W for a valid baud rate, record the M for that range and the clock count for one-bit-time (BT) and continue. Otherwise go back to {54. Detect Start Bit}. (Note: For each detection window, BTmin is defined as BT−W/2 cycles and BTmax is defined as BT+W/2 cycles, where BT=32M cycles.)
58. 1st Character="A" OR "a"?
   a. Measure Bit 0: Wait for a '0'. This waiting period must be between BTmin and BTmax. If so, continue. If not, go to {88. Wait during Guard Time}.
   b. Measure Until Middle of Bit 4: For the next 3.5 BT, RxD must be 0. If, so, continue. If not, go to {88. Wait during Guard Time}.
   c. Sample Bit 5: Wait another BT cycles and sample RxD for bit 5, and continue.
   d. Sample Bit 6: Wait another BT cycles and sample RxD for bit 6. If "1", continue. Otherwise, go to {88. Wait during Guard Time}.
   e. Sample Bit 7 (Can Also be Stop Bit): Count BT cycles and sample RxD. If 'O', continue. Otherwise, first received character pattern is "110000?11 . . . ", and go to {60. Echo Character if Enabled}.
   f. Sample Bit 8 (Can also be Stop Bit or Parity): Count BT cycles and sample RxD. If 'O', continue. Otherwise, first received character pattern is "10000?101 . . . ", and go to {88. Wait during Guard Time}.
   g. Sample Stop Bit: Count BT cycles and sample RxD. If '1', first received character pattern is "10000?1001 . . . ", and continue. Otherwise, go to {88. Wait during Guard Time}.
60. Echo Character if Enabled
   If auto echo is enabled (Corresponding bit of state/configuration registers set to '1'), echo the raw received data on TxD as indicated in the discussion of FIG. 3, and continue.
62. Detect Start Bit of Next Character
   Wait for Start Bit of Second Character: It is now ready for detecting the second character in RxD while the first; character is being echoed (if enabled). Wait for start bit 'O'.
64. Start Bit has min. duration?
   Sample Start Bit: Wait 0.5 BT cycles and sample RxD for '0'. If not, go to {Wait 8 Bit Times}.
66. Receive Next Character
   Sample Bits 0 to 6: After every BT cycles, sample RxD for bits 0, 1, 2, 3, 4, 5, 6.
68. Next Character="A" or "a"?
   If the received seven bits (bits 0, 1, 2, 3, 4, 5, 6) are "1110000X1", return to {60. Echo Character if Enabled}, otherwise continue.
70. Next Character "/"?
   If the received seven bits (bits 0, 1, 2, 3, 4, 5, 6) are "1111010", wait for the next '1', and continue. Otherwise go to {80. Last 2 Characters="AT" or "at"?}.
72. Echo "/" if Enabled
   If auto echo is enabled (Corresponding bit of state/configuration registers set to '1'), echo the raw received data on TxD as indicated in the discussion of FIG. 3, and continue.
74. Turn ON Rx enable
   Set corresponding bit of state/configuration registers to 1. Turn on Rx enable, and continue.
76. Set Interrupt Flag
   Set the corresponding bit in the interrupt flag register to 1, and continue.
78. Turn Autobaud OFF
   Reset the corresponding bit of the state/configuration registers to 0, and go to {50 Autobaud OFF}.
80. Last 2 Characters="AT" or "at"?
   If the received seven bits (bits 0, 1, 2, 3, 4, 5, 6) are "00101?1", where bit 5 is the same as the bit 5 received earlier in 6, then continue. Otherwise go to {88. Wait during Guard Time}.
82. Determine Configuration
   Sample bits 7 and beyond. After every BT cycles, sample RXD and keep track of the number of 'O's before the first '1' is detected, determine the configuration as indicated in Table 1., and continue.

84. Echo Last Character if Enabled

Echo last character if autoecho is enabled.

86. Reconfigure SCC baud rate, bits/character, and parity

Update Configuration to appropriate bit positions in state/configuration registers, and go to {74. Turn on Rx Enable}.

88. Wait during Guard Time

Count 8BT cycles, go to {54. Detect Start Bit}.

It should now be apparent that the objects of the present invention have been satisfied. While the present invention has been described in particular detail, it should also be appreciated that numerous modifications are possible within the intended spirit and scope of the invention.

What is claimed is:

1. A method for automatic detection of baud rate and character configuration of a received asynchronous serial data stream, by detecting a first predetermined two character sequence from patterns of signal states and their durations, wherein the first predetermined two character sequence comprises either of "AT" and "at" and the method comprises:

a) waiting for a transition from a state corresponding to a stop bit or idle state to a state corresponding to a start bit of a first character;

b) measuring the duration of a signal state of the first character begun by said transition;

c) determining whether the measured duration falls within any of a set of predetermined bit time ranges, each bit time range corresponding to a different baud rate of a set of predetermined standard baud rates;

d) if the measured duration does not fall within any of the predetermined ranges, returning to step a);

e) if the measured duration falls within any of the predetermined bit time ranges, determining if the first predetermined two character sequence is received using a standard bit time associated with the bit time range in which the measured duration falls; and f) if it is determined that the first predetermined two character sequence is received using the standard bit time:

1. determining the character configuration therefrom; and 2. using the standard bit time and determined character configuration for receiving subsequent characters.

2. The method as claimed in claim 1, wherein the number of bit per character has a maximum value, and wherein step e) further comprises:

k) measuring the duration of a next signal state of the first character which is begun by a next transition from the state corresponding to the start bit to a state which is the same as that corresponding to a stop bit or idle state; and l) determining whether the measured duration of the next signal state falls within the predetermined bit time range in which the duration measured in step c) falls; and the method further comprises the step of:

m) if the measured duration of the next signal state does not fall within said predetermined bit time range, returning to step a) after waiting for at least a guard time equal to the standard bit time times the maximum number of bits per character.

3. The method as claimed in claim 1, wherein step e) further comprises:

g) determining if the first character is a potential or actual "A" or "a"; and the method further comprises:

h) if it is determined that the first character is potentially or actually an "A" or "a", echoing the first character, which echoing is started before or during reception of a second character.

4. The method as claimed in claim 3, wherein the number of bit per character has a maximum value, and wherein step e) further comprises:

k) measuring the duration of a next signal state of the first character which is begun by a next transition from the state corresponding to the start bit to a state which is the same as that corresponding to a stop bit or idle state; and l) determining whether the measured duration of the next signal state falls within the predetermined bit time range in which the duration measured in step c) falls; and the method further comprises the step of:

m) if the measured duration of the next signal state does not fall within said predetermined bit time range, returning to step a) after waiting for at least a guard time equal to the standard bit time times the maximum number of bits per character.

5. The method as claimed in claim 3, wherein the method further comprises:

j) echoing the second character if it is determined that the first predetermined two character sequence is received.

6. The method as claimed in claim 3, wherein step e) further comprises:

i) determining if a second predetermined two character sequence of either "A/" or "a/" is received.

7. The method as claimed in claim 6, wherein the method further comprises:

j) echoing the second character if it is determined that the first predetermined two character sequence or the second predetermined two character sequence is received.

* * * * *